Patented Oct. 22, 1935

2,018,607

UNITED STATES PATENT OFFICE 2,018,607

PROCESS OF MAKING SODIUM ALUMINATE

Russell E. Cushing, Haddonfield, N. J., and Clarence W. Burkhart, Lansdowne, Pa., assignors to Pennsylvania Salt Manufacturing Company, Philadelphia, Pa., a corporation of Pennsylvania No Drawing. Application November 10, 1934, Serial No. 752,536

15 Claims. (Cl. 23—52)

Our invention relates to an improved process for the manufacture of sodium aluminate, and more particularly it relates to a simple and economic method of producing sodium aluminate in a solid, granular or powdered condition. This application contains subject matter in common with an earlier application Serial No. 559,770, filed August 27, 1931.

One object of our invention is to provide a process of preparing solid sodium aluminate, which process is easily carried out and does not involve the use of high temperatures, costly digestion or evaporation steps, or expensive equipment.

A further object of our invention is to furnish a simple and economic method of manufacturing solid sodium aluminate directly from powdered alumina hydrate and solid caustic soda, which reaction takes place in a very short period of time.

Still another object of our invention is to furnish a method for the production of solid water-soluble sodium aluminate which is uncontaminated by foreign materials, contains about 95% of sodium aluminate, or about 60% of alumina, and dissolves in cold water to form a relatively stable solution.

Other objects will be apparent from a consideration of the specification and claims.

The processes heretofore employed are cumbersome to carry out, are time-consuming, and involve costly manipulative operations. In the Bayer process bauxite is digested with a solution of caustic soda, thus producing a solution of sodium aluminate which is difficultly separated from insoluble matter. The solution is concentrated and the sodium aluminate recovered therefrom. Other methods involve the heating of bauxite and other aluminous material at temperatures varying from 500° C. to 1100° C. with various materials, for example, sodium sulphate and carbonaceous material, or sodium carbonate. The product thus produced contains not only insoluble material from 5% to 10%, but also a considerable amount of sodium carbonate, rendering solutions prepared from the product unstable.

Furthermore, while a sodium aluminate containing a high percentage of soluble alumina and one free from impurities has been desired, it has been very difficult to obtain such a compound by an economic process. Many products contain from 5% to 10% of insoluble matter and a considerable percentage, sometimes in excess of 5%, of sodium carbonate. The presence of the insoluble matter and the carbonates in the sodium aluminate renders solutions made therefrom unstable. Previously no compound made on a commercial scale by a practical process contains as high a percentage as 95% sodium aluminate or 60% of soluble alumina.

The process of the present invention departs markedly from prior practices and the reaction between the alumina hydrate and the caustic soda is not brought about either by aqueous digestion or by fusion, but takes place directly between the two solid substances. In order to obtain a product which may easily be handled, the mixture of solid materials is preferably stirred during the reaction. Also by properly selecting the alumina hydrate, a solid sodium aluminate is prepared, which is, for all practical purposes, free from insoluble matter and carbonates, and is easily soluble in cold water, forming stable solutions. The product thus obtained is further characterized by its high content of sodium aluminate or alumina, the former being in the neighborhood of 95% while the latter is in the neighborhood of 60%.

The process for the production of sodium aluminate preferably involves mixing solid caustic soda and powdered hydrate of alumina in a suitable mixer, the reaction taking place directly between these solid materials of the mixture without aqueous dissolution or fusion of the caustic soda. These two compounds may be reacted in a dry state or a small amount of water insufficient to dissolve the caustic soda may be employed to insure an intimate mixture. The water, if employed, is preferably added to the hydrate of alumina in the mixer. The following equations illustrate the reaction where X is the amount of excess caustic soda over that required for the reactions:

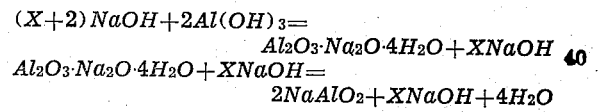

If a finished product containing only a slight excess of $Na_2O$ is desired, the sodium hydroxide and alumina hydrate will be employed in the ratio of 1.1 mols of $Na_2O$ to 1 mol of $Al_2O_3$. However, the process is applicable for the production of compounds where the amounts of $Na_2O$ in the finished product are larger or smaller, and, therefore, the amount of caustic soda employed in any particular reaction will depend on the properties desired. In certain cases, the amount of caustic soda employed will be sufficient to give a product containing 1.2 mols; 1.5 mols, etc, of $Na_2O$.

During the mixing of the caustic soda and alumina hydrate, heat is generated, and this is augmented by additional heat supplied from an external source such as a steam jacket, the final temperature of the material in the mixture not generally reaching 125° C. The heating is continued until most or all of the water added to insure an intimate mixture is removed. Throughout the step of removal of the added water, the reacting mass, which initially due to the reaction, is in the form of a plastic mass is continuously stirred until the resulting product which has a formula approaching:

is in a crumbly or granular condition. If all of the water has not been removed in the mixer, the product may then be placed in a dryer which may take the form of a rotary kiln through which sufficient hot air passes to dehydrate the material to form the anhydrous or substantially anhydrous sodium aluminate ($NaAlO_2$). Complete dehydration at 125° C. is relatively slow, but if a temperature of 250° C. or more is employed, all of the water is removed in a comparatively short time. So rapid is this removal, that temperatures in excess of 250° C. have not been found necessary, although higher temperatures may be used; for example, 500° C., or in fact any temperature up to the melting point of the mix. After the removal from the dryer, the product is in a finished condition and is in the form of white granular material having the properties hereinbefore described. If an especially pure product is desired, the air used for drying may be freed from its carbon dioxide or the material may be dried in the absence of air if care is taken to regulate the heating to prevent the product from liquefying.

The term "alumina hydrate" as employed herein includes both the naturally occurring and artificially prepared alumina hydrates where the degree of hydration corresponds approximately to the trihydrate ($Al_2O_3 \cdot 3H_2O$). Prepared aluminum trihydrate ($Al(OH)_3$) as available on the market, and those bauxite ores containing approximately 30% of combined water, can be used in the process. For example, Arkansas, Georgia—Tennessee—Alabama, and South American (Dutch and British Guiana) bauxites may be utilized as the material to be reacted with the solid caustic soda. If a product of a high degree of purity is desired, containing as high a percentage as 95% sodium aluminate, aluminum trihydrate is employed as the source of the aluminate radical. If, on the other hand, a cheaper grade of product is desired, containing from 80% up to 95% sodium aluminate, a powdered bauxite containing approximately 30% combined water may be used. The percentage of sodium aluminate in the final product will depend upon the purity of the bauxite. Preferably, a bauxite is chosen which contains only a small percentage of silica. For this reason the South American bauxites are particularly applicable. If a bauxite is employed containing more than about 6% silica, the percentage of silica is preferably reduced by the addition of a small amount of aluminum trihydrate, which increases the alumina content of the mixture and assists in bringing about the desired reaction between the powdered bauxite and the solid caustic soda. Also, if a grade of sodium aluminate is required which is purer than is possible with the particular bauxite employed, a small percentage of aluminum trihydrate may be added to the bauxite in order to increase the alumina content of the mixture.

In a typical case 75 pounds of aluminum trihydrate as available on the market are placed in a steam-jacketed mixer and about 6 pounds of water are added during agitation. When the water is uniformly distributed and the temperature raised by means of steam in the steam jacket, for example, to about 100 degrees C., as is estimated by the evolution of steam from the mix, 50 pounds of ground caustic soda are added. A reaction takes place forming hydrated sodium aluminate in the form of a plastic mass, and the stirring and heating are continued until the hydrated product takes the form of a white crumbly mass. This material is then transferred to a rotary kiln, through which hot air passes, and dried until all, or substantially all, of the water which is added, or which is formed by the reaction, is removed, thus an anhydrous, or substantially anhydrous sodium aluminate

mixed with a very small amount of caustic soda is obtained.

In a further typical case employing bauxite, 35 pounds of powdered South American bauxite containing about 60% of $Al_2O_3$, 6% to 8% of combined silica, titanium, and iron oxides, and 30% of combined water are placed in a steam heated mixer with 5 pounds of water. The steam is turned on and the temperature of the mixer is raised—for example—to a temperature of 40 degrees C., or higher, and the mass agitated. In about a minute 50 pounds of powdered or flake caustic soda are added and the stirring of the solid materials is continued. In a very short time—for example—about three minutes, the mass in the mixer becomes plastic or pasty. After about seven minutes stirring, a crumbly condition of the mass appears, and in about eight and one-half minutes steam evolution takes place. After stirring for a total time of about eleven minutes, the reaction is completed and the entire charge which is in the form of a dry, granular product is passed through a drier or kiln and heated to a temperature in the neighborhood of 250° C. in order to remove the water from the hydrated product formed by the reaction. The substantially dehydrated sodium aluminate contains as its only impurities about 6% of insoluble material (present in the bauxite) and a small quantity of excess caustic soda, as required by the trade.

Considerable modification is possible in the amounts of ingredients employed as well as in the method of treatment without departing from the essential features of our invention.

We claim:

1. The process of preparing solid sodium aluminate by reacting powdered alumina hydrate and solid caustic soda directly without aqueous dissolution or fusion of the caustic soda which comprises mixing together powdered alumina hydrate and solid caustic soda, in the absence of sufficient added water to dissolve the caustic soda; and reacting the mixture of solid materials at a temperature insufficient to fuse the caustic soda.

2. The process of preparing solid granular sodium aluminate by reacting powered alumina hydrate and solid caustic soda directly without aqueous dissolution or fusion of the caustic soda which comprises mixing together powdered alumina hydrate and solid caustic soda, in the absence of sufficient added water to dissolve the caustic soda; reacting the mixture of solid materials at a temperature insufficient to fuse the caustic soda; and during the reaction stirring the plastic mass first formed until a solid granular product is obtained.

3. The process of preparing solid granular sodium aluminate by reacting powdered alumina hydrate and solid caustic soda directly without aqueous dissolution or fusion of the caustic soda which comprises mixing together powdered alumina hydrate and solid caustic soda, in the absence of sufficient added water to dissolve the caustic soda; reacting the mixture of solid materials at a temperature insufficient to fuse the caustic soda; during the reaction stirring the plastic mass first formed until a solid granular product is obtained; and thereafter further heating said granular mass at a temperature below the melting point thereof to free it substantially of water and to form a substantially anhydrous granular sodium aluminate.

4. The process of preparing solid sodium aluminate by reacting powdered alumina hydrate and solid caustic soda directly without aqueous dissolution or fusion of the caustic soda which comprises mixing together powdered alumina hydrate and solid caustic soda, in the absence of sufficient added water to dissolve the caustic soda; and reacting the mixture of solid materials at a temperature below that at which an appreciable amount of the water formed by the reaction is removed.

5. The process of preparing solid granular sodium aluminate by reacting powdered alumina hydrate and solid caustic soda directly without aqueous dissolution or fusion of the caustic soda which comprises mixing together powdered alumina hydrate and solid caustic soda, in the absence of sufficient added water to dissolve the caustic soda; reacting the mixture of solid materials at a temperature below that at which an appreciable amount of the water formed by the reaction is removed; and during the reaction stirring the plastic mass first formed until a solid granular product is obtained.

6. The process of preparing solid granular sodium aluminate by reacting powdered alumina hydrate and solid caustic soda directly without aqueous dissolution or fusion of the caustic soda which comprises mixing together powdered alumina hydrate and solid caustic soda, in the absence of sufficient added water to dissolve the caustic soda; reacting the mixture of solid materials at a temperature below that at which an appreciable amount of the water formed by the reaction is removed; during the reaction stirring the plastic mass first formed until a solid granular product is obtained; and thereafter further heating said granular mass at a temperature below the melting point thereof to free it substantially of water and to form a substantially anhydrous granular sodium aluminate.

7. The process of preparing solid granular sodium aluminate by reacting powdered alumina hydrate and solid caustic soda directly without aqueous dissolution or fusion of the caustic soda which comprises mixing together powdered alumina hydrate and solid caustic soda, in the absence of sufficient added water to dissolve the caustic soda; reacting the mixture of solid materials at a temperature of not more than about 100° C., and during the reaction stirring the plastic mass first formed until a solid granular product is obtained.

8. The process of preparing solid granular sodium aluminate by reacting powdered alumina hydrate and solid caustic soda directly without aqueous dissolution or fusion of the caustic soda which comprises mixing together powdered alumina hydrate and solid caustic soda, in the absence of sufficient added water to dissolve the caustic soda; reacting the mixture of solid materials at a temperature of not more than about 100° C.; during the reaction stirring the plastic mass first formed until a solid granular product is obtained; and thereafter further heating said granular mass at a temperature below the melting point thereof to free it substantially of water and to form a substantially anhydrous granular sodium aluminate.

9. The process of preparing solid granular sodium aluminate by reacting powdered alumina hydrate and solid caustic soda directly without aqueous dissolution or fusion of the caustic soda which comprises mixing together powdered alumina hydrate and solid caustic soda in the absence of added water; reacting the mixture of solid materials at a temperature insufficient to fuse the caustic soda; and during the reaction stirring the plastic mass first formed until a solid granular product is obtained.

10. The process of preparing solid granular sodium aluminate by reacting powdered alumina hydrate and solid caustic soda directly without aqueous dissolution or fusion of the caustic soda which comprises mixing together powdered alumina hydrate and solid caustic soda in the absence of added water; reacting the mixture of solid materials at a temperature below that at which an appreciable amount of the water formed by the reaction is removed; and during the reaction stirring the plastic mass first formed until a solid granular product is obtained.

11. The process of preparing solid granular sodium aluminate by reacting powdered alumina hydrate and solid caustic soda directly without aqueous dissolution or fusion of the caustic soda which comprises mixing together powdered alumina hydrate and solid caustic soda in the absence of added water; reacting the mixture of solid materials at a temperature of not more than about 100° C.; and during the reaction stirring the plastic mass first formed until a solid granular product is obtained.

12. The process of preparing solid sodium aluminate which comprises mixing together powdered alumina hydrate and a small amount of water, adding solid caustic soda to the mixture, allowing a reaction to take place at a temperature of not more than about 100° C., stirring the mixture at said relatively low temperature until the mass becomes granular and the hydrate $Al_2O_3 \cdot Na_2O \cdot 4H_2O$ is formed, and thereafter heating the granular mass at a temperature in the neighborhood of 250° C. until substantially all the water has been removed to form substantially anhydrous sodium aluminate.

13. The process of preparing solid sodium aluminate by reacting powdered aluminum trihydrate and solid caustic soda directly without aqueous dissolution or fusion of the caustic soda, which comprises mixing together powdered aluminum trihydrate and solid caustic soda in the absence of sufficient added water to dissolve the solid caustic soda; and reacting the mixture of solid materials at a temperature insufficient to fuse the caustic soda.

14. The process of preparing solid sodium aluminate by reacting powdered bauxite containing in the neighborhood of 30% combined water and solid caustic soda directly without aqueous dissolution or fusion of the caustic soda, which comprises mixing together powdered bauxite containing in the neighborhood of 30% combined water and solid caustic soda, in the absence of sufficient added water to dissolve the caustic soda, and reacting the mixture of solid materials at a temperature insufficient to fuse the caustic soda.

15. The process of preparing solid sodium aluminate by reacting powdered bauxite containing in the neighborhood of 30% combined water and solid caustic soda directly without dissolution or fusion of the caustic soda, which comprises mixing together powdered bauxite containing in the neighborhood of 30% combined water, a small percentage of powdered aluminum trihydrate to reduce the percentage of insoluble materials in the mixture and solid caustic soda in the absence of sufficient added water to dissolve the caustic soda; and reacting the mixture of solid materials at a temperature insufficient to fuse the caustic soda.

RUSSELL E. CUSHING.
CLARENCE W. BURKHART.